United States Patent
Proctor et al.

(10) Patent No.: US 10,331,536 B2
(45) Date of Patent: Jun. 25, 2019

(54) SYSTEMS AND METHODS FOR MONITORING HEALTH INDICATORS ASSOCIATED WITH APPLICATIONS

(71) Applicant: MASTERCARD INTERNATIONAL INCORPORATED, Purchase, NY (US)

(72) Inventors: Michael Proctor, St. Charles, MO (US); William Watson, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 247 days.

(21) Appl. No.: 15/235,793

(22) Filed: Aug. 12, 2016

(65) Prior Publication Data

US 2018/0046995 A1 Feb. 15, 2018

(51) Int. Cl.
*G06F 11/30* (2006.01)
*G06F 11/32* (2006.01)
(Continued)

(52) U.S. Cl.
CPC ............ *G06F 11/327* (2013.01); *G06F 11/30* (2013.01); *G06F 11/302* (2013.01); *G06F 11/3006* (2013.01); *G06F 11/3051* (2013.01); *G06F 11/32* (2013.01); *G06F 11/321* (2013.01); *G06F 11/328* (2013.01); *G06F 21/6245* (2013.01); *G06Q 10/105* (2013.01); *G06Q 20/0655* (2013.01); *G06Q 20/10* (2013.01)

(58) Field of Classification Search
None
See application file for complete search history.

(56) References Cited

U.S. PATENT DOCUMENTS

| | | | | |
|---|---|---|---|---|
| 6,901,582 B1 * | 5/2005 | Harrison | ............... | G06F 11/328 702/119 |
| 2006/0005070 A1 * | 1/2006 | Zimmer | .............. | G06F 11/0727 714/5.11 |

(Continued)

OTHER PUBLICATIONS

CA Wily Introscope; 2007 ©; 6 pgs.
Application Performance Management APM; accessed Aug. 12, 2016; 5 pgs.

*Primary Examiner* — Lewis A Bullock, Jr.
*Assistant Examiner* — Mark A Gooray
(74) *Attorney, Agent, or Firm* — Harness, Dickey & Pierce, P.L.C.

(57) ABSTRACT

Systems and methods for use in evaluating health associated with one or more applications are disclosed. One exemplary method includes exposing, by a computing device, an application programming interface (API) where the API defines a standard form associated with health indicator packets, and receiving, at the computing device, via the API, a health indicator packet for a health indicator from at least one application where the health indicator packet conforms to the standard form and including a value for the health indicator for the at least one application. The method also includes causing an interface to be displayed to a user where the interface includes a visual effect representative of the value, whereby the user is able to assess health of the application, at least in part based on the value, by viewing the interface.

16 Claims, 6 Drawing Sheets

(51) Int. Cl.
*G06Q 20/10* (2012.01)
*G06Q 10/10* (2012.01)
*G06F 21/62* (2013.01)
*G06Q 20/06* (2012.01)

(56) References Cited

U.S. PATENT DOCUMENTS

| | | | | |
|---|---|---|---|---|
| 2013/0283106 A1* | 10/2013 | King | ................... | G06F 11/327 |
| | | | | 714/49 |
| 2014/0365991 A1* | 12/2014 | Bhardwaj | ................ | G06F 8/70 |
| | | | | 717/102 |
| 2017/0244740 A1* | 8/2017 | Mahabir | ............. | H04L 63/1433 |

\* cited by examiner

US 10,331,536 B2

SYSTEMS AND METHODS FOR MONITORING HEALTH INDICATORS ASSOCIATED WITH APPLICATIONS

FIELD

The present disclosure generally relates to systems and methods for use in monitoring health indicators associated with applications, and in particular, to systems and methods for use in enabling applications to report particular health indicators for visualization of health associated with the applications.

BACKGROUND

This section provides background information related to the present disclosure which is not necessarily prior art.

Payment networks are known to facilitate payment account transactions, through which consumers are able to fund purchases of products, such as, for example, goods and services. In connection therewith, or apart therefrom, the payment networks are known to provide a variety of services, which are manifest in dozens or even hundreds of applications dispersed geographically throughout the payment networks and often supported by a number of different development teams. To provide desired quality of the services associated with the applications, the payment networks often rely on development teams, and/or further on support teams, to maintain the applications, and when necessary, address issues, revisions, and/or improvement for the applications. When the applications rely on other applications, or are relied on by other applications, the teams are known to work together to maintain the applications.

Separately, application performance management tools are available to detect potential issues with applications. Typically, these tools predefined a set of performance measures generically, which are then selected and/or used to gauge the performance of the deployed applications.

DRAWINGS

The drawings described herein are for illustrative purposes only of selected embodiments and not all possible implementations, and are not intended to limit the scope of the present disclosure.

Figure 1:
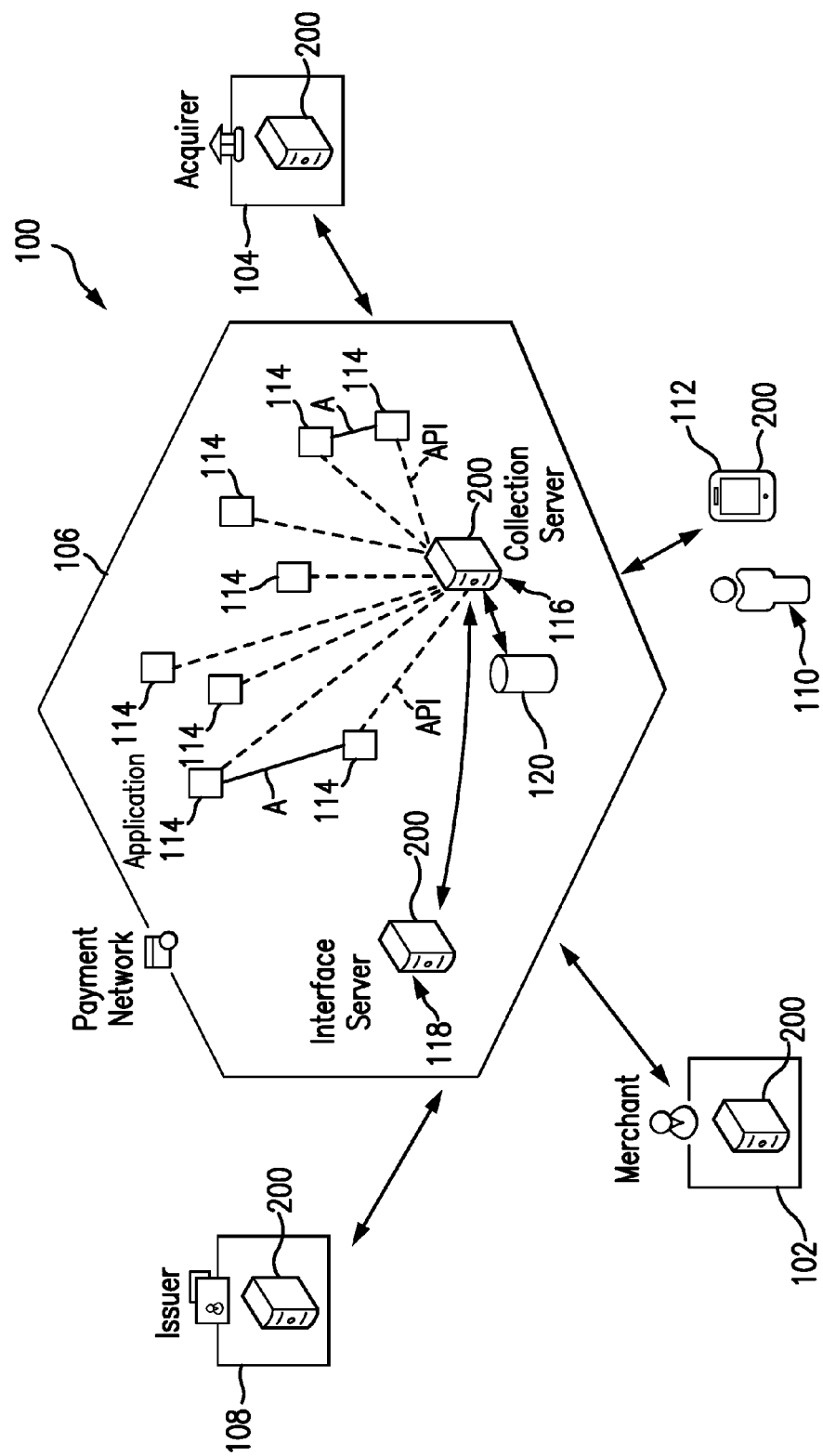
FIG. 1 illustrates an exemplary system suitable for use in monitoring health associated with one or more applications, and including one or more aspects of the present disclosure.
Figure 3:
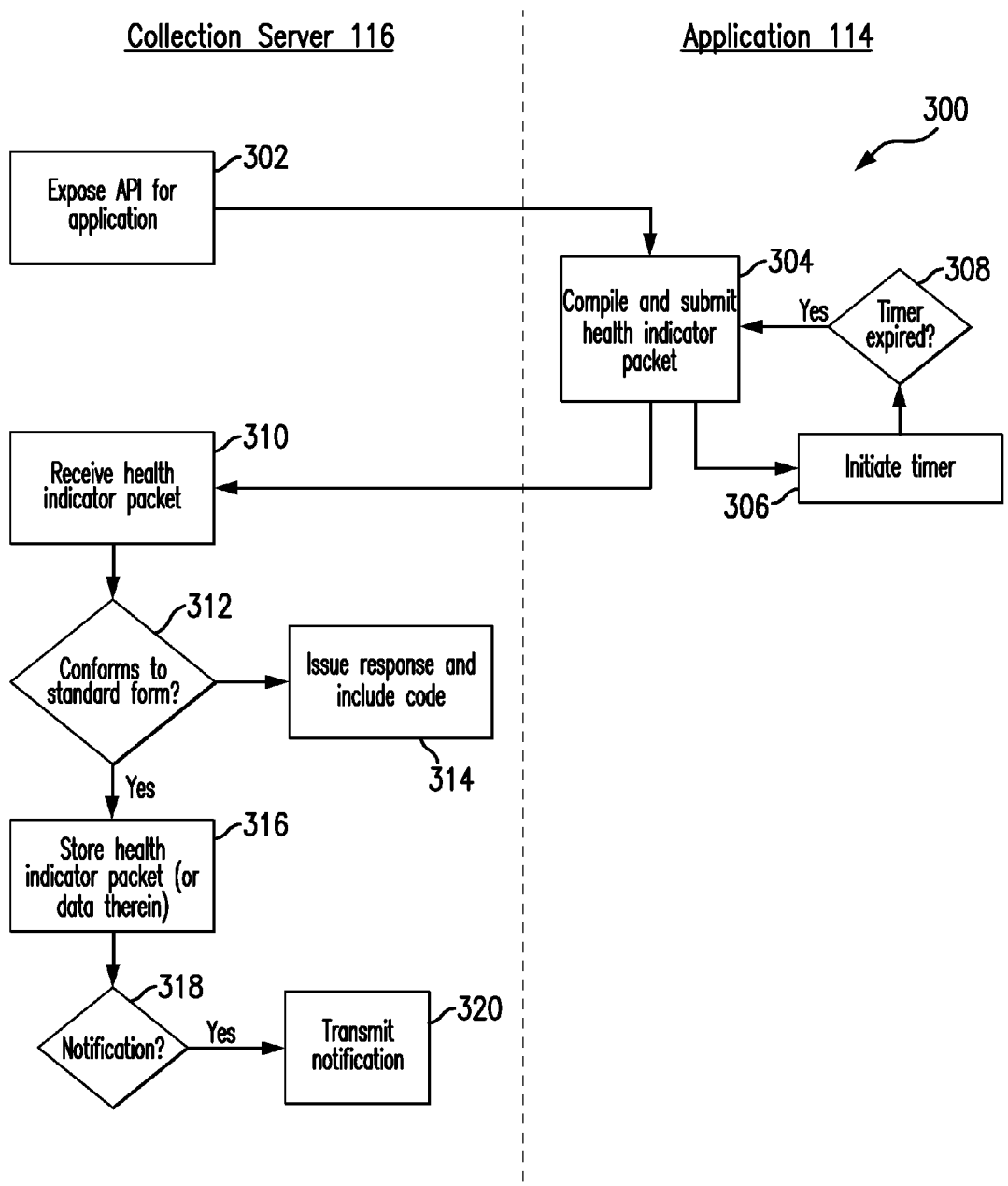
Figure 4:
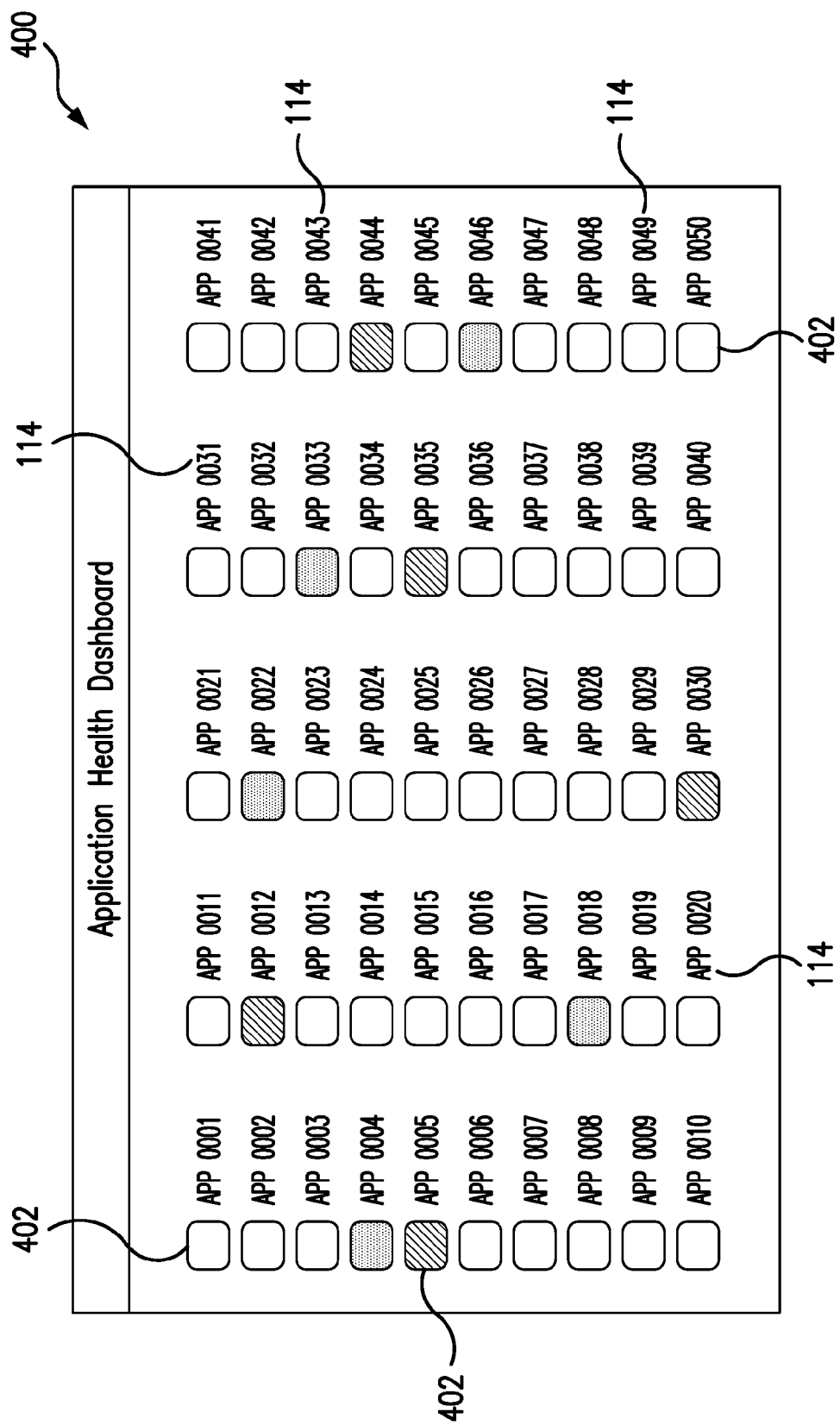
Figure 5:
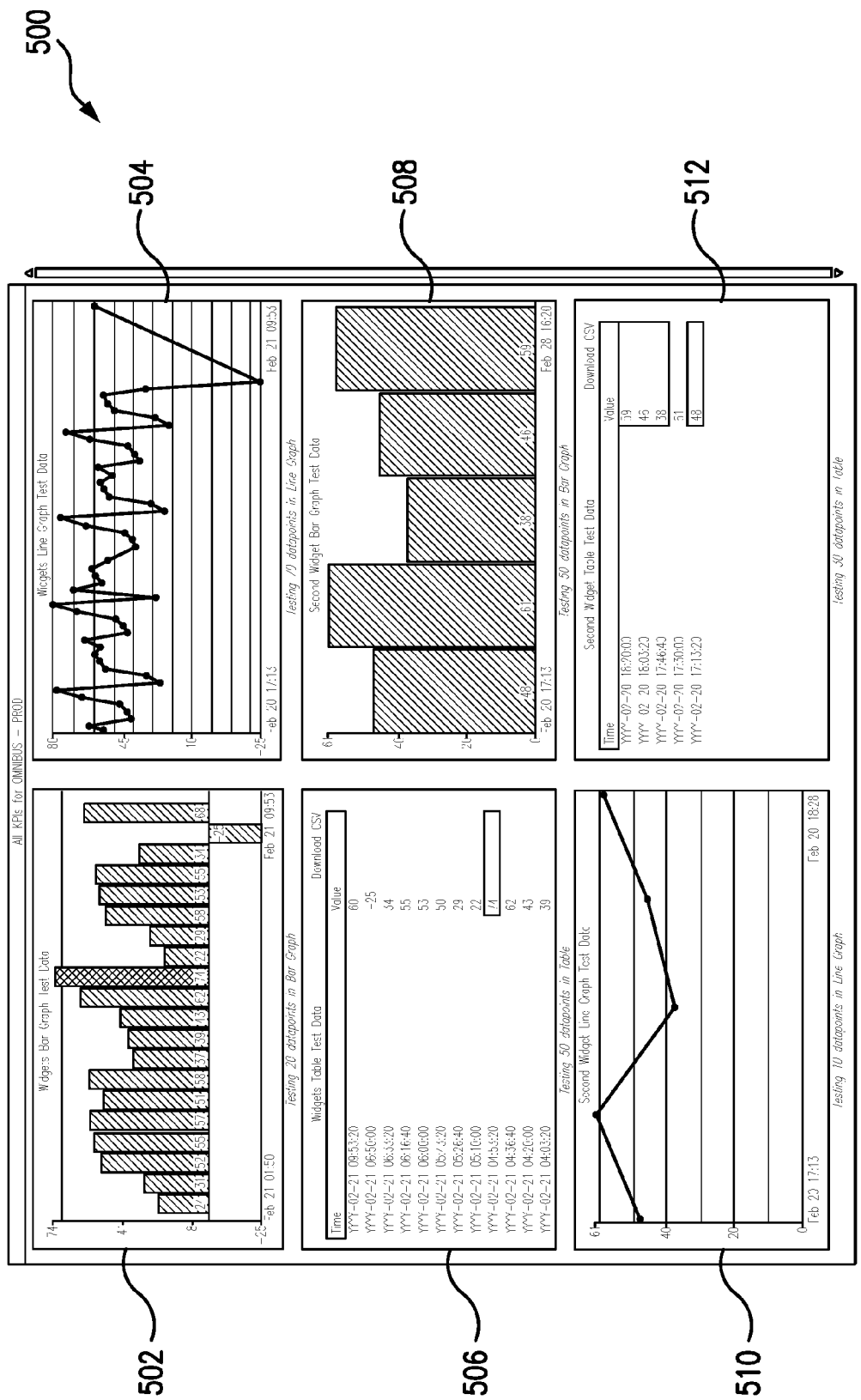
Figure 6:
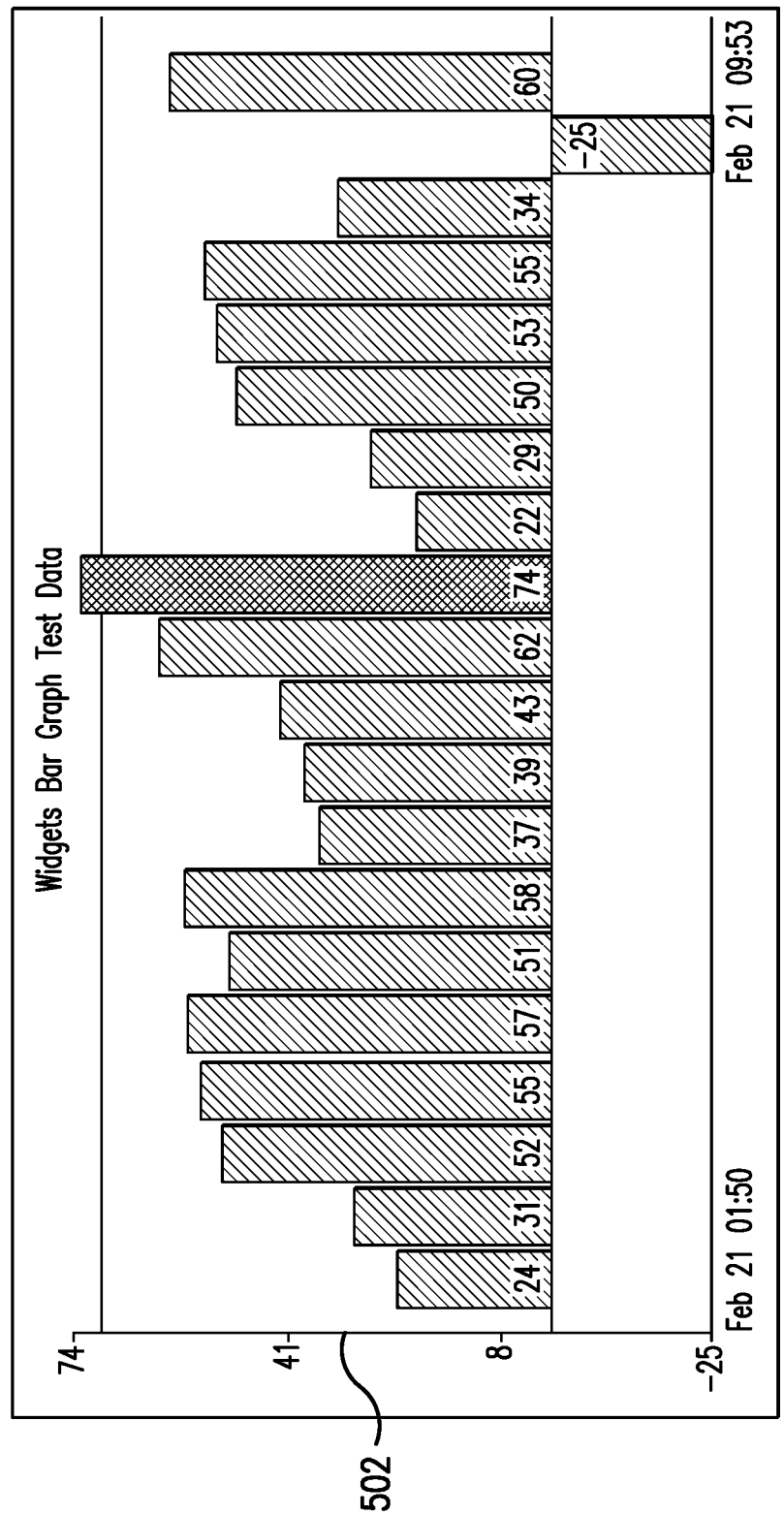

FIG. 3 is a flowchart of an exemplary method, which can be implemented via the system of FIG. 1, for monitoring health associated with one or more applications, through the collection and visualization of health indicators associated with the one or more applications; and FIGS. 4-6 include exemplary interfaces, including visual effects representative of health indicators for applications and values therefore, suitable for use in the exemplary system of FIG. 1 and/or the exemplary method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks, and other business entities, maintain applications on which they rely to provide customer services. The entities often employ resources, sometimes significant resources, to promote proper operation of the applications, in order to provide desired quality of the application-based services to consumers. The resources are generally aimed at improving and/or maintaining health of the applications, which may be difficult to gauge when dozens or even hundreds of the applications, which may be independent or reliant on one another, are provided in disparate locations and maintained/serviced by different teams. Uniquely, the systems and methods herein provide for collection of health indicators, specifically identified to the applications, and allow for viewing of the health indicators in interfaces (e.g., dashboard interfaces, etc.) to provide visual insight into the overall health of the applications for the entity. In particular, a collection server, for example, may provide one or more application programming interfaces (APIs), which are called by one or more applications to report health indicators defined for the applications, thresholds upon which the health indicators may be judged (e.g., clear, warning, critical, etc.), and further actions to be initiated when the health indicators fail to satisfy the thresholds. Further, an interface server, for example, may provide visualization of the health indicators (and values thereof) in one or more interfaces, sometimes relative to one or more thresholds, in one or more representative forms, whereby users viewing the interfaces are able to determine the overall health of the application or applications, and/or identify applications having issues, etc. In this manner, health monitoring is provided specific to the application or applications (and defined therein), with reliance on the individual application(s) to report the particular health indicators to be used to monitor such health. In so doing, visualization of the health indicators to users associated with entities providing the applications is permitted, often resulting in efficient and improved assessment, maintenance, and support for the individual application(s), as needed, etc.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, depending on, for example, types of business entities and/or applications involved, etc. It should be appreciated that the disclosure herein is described with reference to a payment network for purposes of illustration, and that the disclosure should not be understood to be limited to payment networks, as other entities (other than payment networks) may employ the description provided herein and are considered within the scope of the present disclosure.

As shown in FIG. 1, the illustrated system 100 generally includes a merchant 102, an acquirer 104, a payment network 106 (broadly, a business entity herein), an issuer 108, and a consumer 110, each coupled to one or more networks. Regardless of the arrangement of the one or more networks, or even the number of networks in the system 100, network connections are indicated in FIG. 1 by arrowed lines between the various particular parts of the system 100. The networks may include, without limitation, wired and/or wireless networks, local area networks (LANs), wide area networks (WANs) (e.g., the Internet, etc.), mobile networks, and/or other suitable public and/or private networks capable of supporting communication among two or more of the illustrated parts of the system 100, or any combination thereof. In one example, the acquirer 104, the payment network 106, and the issuer 108 are connected through a private network for processing payment transactions (or offering further services), while the merchant 102 and/or the consumer 110 (or, more specifically, a communication device 112 associated with consumer 110, etc.) are connected with the payment network 106, for example, through a public network, such as the Internet.

In this exemplary embodiment, the payment network 106 includes multiple applications illustrated as blocks and each referenced 114. The applications 114 are involved in and/or perform various services related to the payment network 106. Example applications 114 include, without limitations, loyalty rewards applications to provide rewards to payment accounts for consumers (associated with the payment accounts) to use to fund purchase transactions; virtual wallet applications for use in providing payment credentials to merchants (e.g., to the merchant 102, etc.); geo-location applications for use in determining locations associated with merchants, consumers, etc.; bill pay applications for use by consumers (or others) in paying bills via their payment accounts; enhanced security applications for use in providing enhanced authentication prior to purchase transactions; applications for use in enabling mobile payments; etc.

Importantly in the illustrated system 100, the applications 114 may provide any of a variety of services, which may be both related to and not related to payment account transactions. With that said, it should be appreciated that the applications 114 may include any different types of applications directed to any different types of services to be performed, whether internal to the payment network 106, external to the payment network 106 (despite the illustration as included in payment network 106 in FIG. 1), or both, to provide interactions with one or more of the other entities in FIG. 1 (broadly payment network customers) (e.g., where the applications are included in payment network 106, but exposed to consumer 110; etc.), or to other entities not shown.

It should also be appreciated that various ones of the applications 114 in payment network 106 may be dependent on other ones of the applications 114 (as shown by the interconnecting solid lines A in FIG. 1 between various ones of the applications 114). For example, a virtual wallet application may rely on a separate rewards application and/or a login credentials application. As a consequence of these dependencies, when an issue arises with an application 114, another application 114, dependent on that application 114 may also experience issues (e.g., critical, major, or minor), or potentially, no issues.

With continued reference to FIG. 1, in the illustrated system 100, the merchant 102 provides products (e.g., goods and/or services, etc.) for sale at physical and/or virtual locations to consumers (including the consumer 110). The consumer 110, in turn, is associated with a payment account issued by the issuer 108 and that can be used to fund purchases of the product(s) from the merchant 102.

In an example transaction, when the consumer 110 intends to make a purchase at the merchant 102, funded by the payment account, the consumer 110 presents a payment device associated with the payment account to the merchant 102. In this example, the payment device includes a virtual wallet application 114 installed at the communication device 112 and hosted by the payment network 106. In turn, the merchant 102 reads payment account information from the virtual wallet application 114. The merchant 102 then submits an authorization request to the acquirer 104 (associated with the merchant 102) for processing the transaction.

In turn, upon receiving the authorization request for the example transaction from the merchant 102, the acquirer 104 communicates the authorization request with the issuer 108 (associated with the consumer's payment account), through the payment network 106, such as, for example, through MasterCard®, VISA®, Discover®, American Express®, etc. As the authorization request passes through the payment network 106 (or is intercepted by the payment network 106), a fraud detection application 114 is invoked to investigate and score the transaction for fraud. In addition, other applications 114 may be active, and may provide services in connection with the transaction, including, for example, enhanced authentication, consumer controls, coupons, and/or loyalty services, etc. Apart from the payment network 106 (although potentially based on applications 114 included in the payment network 106), the issuer 108 then receives the authorization request and determines whether to approve or decline the transaction (e.g., based on credit, standing of the payment account, fraud scoring, etc.).

If the example transaction is declined by the issuer 108, an authorization reply is provided back to the merchant 102 (via the payment network 106 and the acquirer 104), thereby permitting the merchant 102 to end the transaction. Conversely, if the transaction is approved, an authorization reply is transmitted back from the issuer 108 to the merchant 102, thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). One or more further applications 114, associated with the payment network 106, may be involved in clearing and settlement interactions, and further involved in ancillary functions, including: interfacing with online merchants' websites; assessing the fraud risk associated with a transaction being authorized; assigning consumer rewards for the settled/cleared transactions; or providing analytics based on the transaction data associated with this and other transactions.

Further, while one merchant 102, one acquirer 104, one payment network 106, one issuer 108, and one consumer 110 are illustrated in FIG. 1, it should be appreciated that any number of these entities (and their associated components) may be included in the system 100, or may be included as entities of systems in other embodiments, consistent with the present disclosure.

Figure 2:
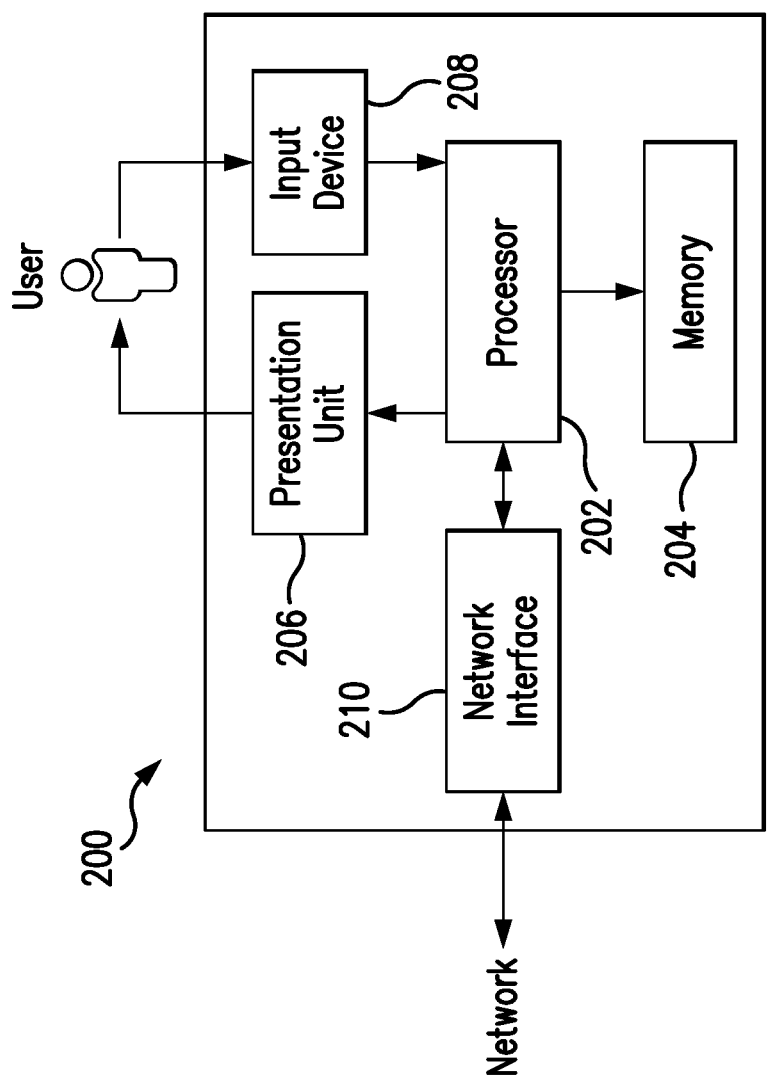
FIG. 2 is a block diagram of an exemplary computing device, suitable for use in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the system 100, each of the merchant 102, the acquirer 104, the issuer 108, and the communication device 112 are illustrated as including, or being implemented in, computing device 200. In addition, the payment network 106 (which may be considered as including or being implemented in a computing device consistent with computing device 200) also includes multiple applications 114, each of which may be hosted by and/or implemented in one or more computing devices (not shown), and a collection server 116 (or engine)

and interface server 118 (or engine), each of which is generally consistent with computing device 200. With that said, the systems herein should not be considered to be limited to the computing device 200, as described below, as different computing devices and/or arrangements of computing devices may be used.

Referring to FIG. 2, the exemplary computing device 200 generally includes a processor 202 and a memory 204 coupled to (and in communication with) the processor 202. The processor 202 may include one or more processing units (e.g., in a multi-core configuration, etc.) including, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are exemplary only, and are not intended to limit in any way the definition and/or meaning of processor.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204, and/or data structures included therein, may be configured to store, without limitation, health indicator packets (and data included therein (e.g., values, thresholds, settings, etc.)), interfaces, applications, APIs, and/or other types of data and/or information suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. It should be appreciated that the memory 204 may include a variety of different memories, each implemented in one or more of the functions or processes described herein.

The computing device 200 also includes a presentation unit 206 (or output device or display device) that is coupled to (and is in communication with) the processor 202 (however, it should be appreciated that the computing device 200 could include output devices other than the presentation unit 206, etc.). The presentation unit 206 outputs information (e.g., health status of applications, etc.), either visually or audibly, to a user of the computing device 200, for example, a user associated with one or more parts of the system 100, etc. It should be further appreciated that various interfaces may be displayed at computing device 200, and in particular at presentation unit 206, to display data, such as, for example, health indicators for one or more of the multiple applications 114, etc. The presentation unit 206 may include, without limitation, a liquid crystal display (LCD), a light-emitting diode (LED) display, an organic LED (OLED) display, an "electronic ink" display, etc. In some embodiments, presentation unit 206 includes multiple devices.

The computing device 200 further includes an input device 208 that receives inputs from the user of the computing device 200 (i.e., user inputs). The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. In various exemplary embodiments, a touch screen, such as that included in a tablet, a smartphone, or similar device, behaves as both a presentation unit 206 and an input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks in the system 100, for example. Further, in some exemplary embodiments, the computing device 200 includes the processor 202 and one or more network interfaces incorporated into or with the processor 202.

Referring again to FIG. 1, the payment network 106 includes the collection server 116 and the interface server 118. While the servers 116 and 118 are illustrated as separate, it should be appreciated that the servers 116 and 118 may be included in a single server and/or, more generally, one or more computing devices in other system embodiments. Additionally, while illustrated as separate from the applications 114, nothing in this disclosure should be understood to prevent one or more of the applications 114 from being implemented, in whole or in part, in either the collection server 116 and/or the interface server 118, or not.

In this exemplary embodiment, the collection server 116 is configured to expose an application programming interface, or API, or multiple such APIs, through which the collection server 116 is able to receive one or more health indicator packets from one or more of the applications 114 associated with the payment network 106 (as indicated by the dotted lines in FIG. 1). In connection therewith, and as will be described more hereinafter, the collection server 116 may be configured via the following exemplary representative code segment to test a standard form (e.g., !formatValidate(hi_name), etc.) for each health indicator packet received, and then further transmit one or more notations regarding the unsuccessful receipt of the health indicator packet (in standard form) (e.g., Code 400 indicating Failed/Error, an "invalid format" notation, etc.) and/or the successful receipt of the health indicator packet (in standard form):

```
foreach (received_health_indicators as hi_name) {
  if (!formatValidate(hi_name)) {
    sendClientResponse(HTTP_400, "Received malformed data.");
    exit;
  }
  pruneOldRecords(hi_name);
  result = checkForViolation(hi_name);
  if (result == TRUE) {
    dispatchNotification(hi_name);
  }
}
sendClientResponse(HTTP_200, "Successfully received your records.");
```

More particularly in the illustrated embodiment, the collection server 116 is also configured, via the API(s), to accept health indicator packets in a standard form from one or more of the applications 114. The standard form includes, in this example, a standard format and/or standard attributes (for a given health indicator of an application). Specifically, for example, the collection server 116 may be configured to permit health indicator packets to be submitted in a JavaScript Object Notation (JSON) format or a Comma-Separated Values (CSV) format, or another suitable format, with the packets then including specific attributes for a health indicator (or multiple heath indicators) of a particular application 114 (consistent with the particular format). Table 1 includes exemplary attributes, which may be included in one or more health indicator packets.

TABLE 1

| Attribute Name | Attribute Description |
| --- | --- |
| api_version | Version of the API |
| app_name | Application name |
| hi_name | Health indicator name |
| description | Description |
| datatype | Type of data, acceptable inputs are int, float, or text |
| hi_value | Value of the health indicator |
| time | The date and time associated with the health indicator value (i.e., timestamp) |
| display_type | Type of display, acceptable inputs are line, bar, table |
| display_size | The number of sample to display, up to 50 |
| threshold_enable | Either Y or N for use of threshold |
| threshold_type | Type of threshold, acceptable inputs are none, fixed, min, max, or avg. |
| threshold_value | Value of the threshold is fixed, or number of previous value when min, max, or avg. |
| threshold_display | Either Y or N to display threshold |
| enable_notify | Either Y or N to enable notifications |
| notify_condition | Condition for notify, acceptable inputs include over, under, equal, or not equal |
| notify_type | Type of notification (e.g., email) |
| notify_dest | Destination of notification (e.g., john@smith.com) |
| priority | Indicates priority relative to other health indicator, when interface space is limited |
| severity | Indicates a state of a visual effect, acceptable inputs include clear, indeterminate, warning, minor, major critical |

As shown in Table 1, attributes for an application 114 (as included in a health indicator packet for the application 114) may include, for example, an application name ("app_name"), a health indicator name ("hi_name"), a value for the health indicator ("hi_value"), a threshold value ("threshold_value") for the health indicator (e.g., used as a basis for sending notifications to indicated users, etc.), and others, as described in more detail below. In addition, in connection with the threshold value in Table 1, instructions may further be provided to determine the threshold, for example, based on one or more prior values for the health indicator of the particular application 114 (e.g., as part of the "threshold_type" attribute). For example, if the threshold type is fixed, then a fixed value to use as the threshold may simply be the value of the health indicator. However, if the threshold type is either "min," "max," or "avg.," then a predefined number of prior values for the health indicator may be used, by the collection server 116, to actually generate/determine the minimum, maximum, or average threshold value for use.

In this exemplary embodiment, the attributes are generally not specific to one application or another (or to specific performance measures), but instead are substantially generic to multiple applications. It should also be appreciated that more, less and/or different attributes may be included in other system embodiments (other than illustrated in Table 1). For example, threshold multipliers and/or offsets may be included as attributes in certain health indicator packets. Further, attributes relating to use of multiple thresholds for various health indicators may be included in some health indicator packets (e.g., as a variable-length array of thresholds, a threshold containing a list of values, etc.). In such embodiments, the attributes relating to the multiple thresholds may include, for example, a "threshold_type" attribute, a "threshold_enable" attribute, a "threshold_display" attribute, etc. (following a similar format to what is included in Table 1).

With continued reference to FIG. 1, each of the applications 114 associated with the payment network 106 in the system 100 is configured, by computer-executable instructions, to compile and submit one or more health indicator packets (comprising the appropriate attributes) to the collection server 116, via the API (in the appropriate format). In connection therewith, transport of the health indicator packets may be achieved via a Unix/Linux utility called curl: curl-H "Content-Type: application/json"-X POST-data-binary@test_data https://healthserver.domain/hi. For various applications 114, an associated developer (or multiple developers) (not shown) may use available libraries (e.g., off-the-shelf libraries, etc.) to create health indicator packets consistent with the JSON format or CSV format. In so doing, the developer(s) are able to create a data structure following Table 1, for example, and call the library (or libraries) to produce (technically, serialize) the health indicator packets (for one or more health indicators) based on the data structure and consistent with the standard form as defined by the collection server 116.

That is, during development of the applications 114, a developer (or multiple developers) (not shown) determines one or more health indicators for the applications 114, potentially referred to as key performance indicators. Often, the health indicators include metrics, upon which the developer(s) expect the health of the given applications 114 to be apparent. For example, a health indicator for a virtual wallet application may include "cardholder registrations in the last 15 minutes," and a health indicator for a real-time risk scoring application may include "transactions in the last 60 seconds." In addition, a health indicator for a web application may include "client hits in the last 60 seconds," and a health indicator for a database system may include "memory utilization as percent of maximum." It should be appreciated that the health indicators are often determined by developers of the applications 114 (often based on the judgement of the developers) and will therefore be particular to applications and vary between different applications (without generically designating the same health indicators to all applications 114). The standard form of the health indicator packets is adapted to provide this flexibility for the application developers. In addition, it should be appreciated that one or more of the applications 114 may include multiple different health indicators (potentially each included together in a health indicator packet, or each included in separate health indicator packets).

For each of the applications 114, after the particular health indicators to be used for the applications 114 are identified, the developer(s) further determines expected values or ranges of values for the identified health indicators, from which the developer(s) identifies a threshold (or multiple thresholds) for inclusion in the health indicator packets (e.g., the threshold_type and threshold_value attributes in Table 1, etc.). The developer(s) also determines how the health indicator should be displayed (e.g., the display_type attribute in Table 1, etc.) relative to the threshold(s) (e.g., the threshold_display attribute in Table 1, etc.), and further if a notification should be issued (e.g., the enable_notify attribute in Table 1, etc.), on what condition the notification should be provided (e.g., the notify_condition attribute in Table 1, etc.), and the type and destination of the notification (e.g., the notify_type and notify_dest attribute in Table 1, etc.), etc. The developer(s) may further determine how the health indicator is to be displayed, relative to other conditions (broadly, thresholds), and/or further actions, as permitted by the standard form of the health indicator packets of the particular embodiments. Thus, in this manner, it can be seen that the health indicators may be uniquely tailored for the applications 114 in the illustrated embodiment.

Once some or all of the attributes are determined for the applications 114, the developer(s) appends computer-executable instructions, to the applications 114, which uniquely configure the applications 114, in this exemplary embodiment, to compile health indicator packets (consistent with the standard form required by the collection server 116, as described above) and submit the health indicator packets to the collection server 116, via the API.

The applications 114 may further be configured, via the computer-executable instructions, to compile and submit the health indicator packets at one or more regular or irregular time intervals (e.g., as push messages, etc.). For example, one application 114 may be configured to compile and submit a health indicator packet every 20 seconds, while another application 114 may be configured to compile and submit a health indicator packet every 15 minutes. Other intervals may include, for example, 5 seconds, 30 seconds, 1 minute, 5 minutes, 18 minutes, 1 hour or any other interval, etc. In such examples, the applications 114 may be configured to initiate a timer (consistent with the particular interval for the application 114) and to compile and generate a health indicator packet at each time interval the timer expires. Alternatively, or additionally, the applications 114 may be configured to compile and submit health indicator packets based on some condition different than time. Regardless of the basis/condition, though, in various embodiments, the applications 114 are configured to include, in health indicator packets, time stamps, including, for example, the time and/or date at which the packets were compiled and/or submitted (or when the value of the health indicators therein were recorded/obtained), etc.

A segment of an exemplary health indicator packet consistent with the JSON standard format, submitted by a virtual wallet application, may include:

{"HiData":[{"appname":"v-wallet","hi_name":"cardholder registration in last 15 minutes", "data_type":"int","hi_value":"42" . . . }]}

For the same virtual wallet application, a segment of an exemplary health indicator packet consistent with the CSV standard format and submitted by the virtual wallet application may include:

appname, hi_name, data_type, hi_value, . . .
v-wallet, cardholder registration last 15 minutes, int, 42, . . .
v-wallet, successful transactions last 5 minutes, int, 6942, . . .
. . .

With that said, it should be appreciated that a variety of different packets may be included to provide health indicators for virtual wallet applications and other applications in other examples. It should also be appreciated that the health indicator packets for one or more applications 114, and even particular health indicators, may be different from submission to submission. Specifically, for example, an initial health indicator packet may include all, substantially all, or certain attributes (e.g., as listed in Table 1, etc.), while subsequent health indicator packets may include only updated values/attributes (e.g., "hi_value").

In response to the submitted health indicator packet for an application 114, the collection server 116 is configured to receive the health indicator packet and to determine if the health indicator packet conforms to the appropriate standard form. If it does not, the collection server 116 is configured to generate and transmit an error message to the application 114 submitting the packet. The error message may include an error code indicative of the error (e.g., E002 (POST data received could not be parsed as JSON), E006 (invalid datatype), E024 (value out of range), etc.). Conversely, if the health indicator packet conforms to the standard form, the collection server 116 is configured to store the health indicator packet, or at least data included therein, in a packet data structure 120 (e.g., included in memory 204 associated with and/or included in the collection server 116, etc.).

The collection server 116 is further configured, then, to determine if any notifications are required in connection with the received health indicator packet for the application 114 (based on the attributes included in the health indicator packet (e.g., the "enable_notify" attribute, the "notify_condition" attribute, the "notify_type" attribute, the "notify_dest" attribute, etc.), as described more in connection with method 300). When required, the collection service 116 is configured to generate and transmit the appropriate notifications (e.g., via electronic mail, etc.) to identified recipients. Alternatively, the collection server 116 may interact with a separate notification system, via that system's own API, to send the notifications or other types of notifications.

Separately, in this exemplary embodiment, the interface server 118 is configured to access data in the packet data structure 120 for various applications 114 and to render interfaces including visual effects based on the data. The visual effects may include, for example, line charts, bar charts, tables, or colored buttons, etc. (as selected at the attribute "display_type," for example), which provides visual insight into the health of the applications 114, or at least as to the health indicators selected by the developer(s) of the applications 114. The interfaces and visual effects are described in more detail below with reference to FIGS. 4-6.

FIG. 3 illustrates an exemplary method 300 for use in monitoring health associated with one or more application, through visualization of health indicators associated with the applications. The exemplary method 300 is described as implemented in the payment network 106 of the system 100 and, more particularly, in the applications 114 and the collection server 116 thereof. It should be understood, however, that the methods herein (including the method 300) are not limited to the exemplary system 100 or the exemplary computing device 200. Likewise, the systems and the computing devices herein should not be understood to be limited to the exemplary method 300. In addition, while the method 300 is described with reference to the payment network 106, the methods described herein are applicable to a variety of entities (other than the payment network 106). Generally, again, the systems and methods herein may include any different type of business entities in which application are included to provide services internal to and/or externally to customers, etc.

Further, the method 300 is described with reference to multiple exemplary interfaces 400-600 shown in FIGS. 4-6. The interfaces 400-600 should not be understood to limit the methods herein (including the method 300) to any particular interface(s). Similarly, the method 300 should also not be understood to limit the interfaces that may be used herein, for example, in combination with the disclosed methods and systems.

At shown in FIG. 3, at 302, the collection server 116 initially exposes an API for the collection of a health indicator packet from an application 114. As described above, the API requires a standard form for the health indicator packet, which includes a specified standard format (e.g., JSON, CSV, etc.) and specific attributes (as listed in Table 1, for example, or otherwise described herein).

The application 114, in turn, compiles and submits (e.g., via push messaging, etc.) a health indicator packet, at 304, to the collection server 116. In particular, for a given health indicator associated with the application 114, the health indicator name is known, as well as the other attributes set by the developer, which are then included in the health indicator packet. The application 114 further determines, for each health indicator to be included in the health indicator packet (if multiple health indicators have been set by the developer, and if multiple health indicators are to be included in the health indicator packet), the value of the health indicator at a time when the health indicator packet is to be compiled. The application 114 then includes the value in the health indicator packet, along with a time and/or date associated with the value. Once compiled, the health indicator packet is submitted.

In this exemplary embodiment, in connection with compiling and submitting the health indicator packet, the application 114 further initiates a timer, at 306. The timer may include any desired interval such as, for example, 10 seconds, 20 seconds, 30 seconds, 10 minutes, 1 hour, or some other regular or irregular time interval, etc. Often, the time interval is selected based on the health indicator, importance of the application 114, impact to customers/consumers by issues arising with the application 114, the maintenance and/or reliability history of the application 114, and/or the speed at which the application 114 may cause issues to particular services of the payment network 106, etc. For example, an application, which is involved in authentication of transactions, of which hundreds or thousands occur per second, is a critical application, for which the time interval may be a second or less. In any case, once the timer is initiated (at 306), the application 114 monitors for the timer to expire, at 308, at which time the application 114 again compiles and submits a health indicator packet.

In at least one embodiment, when compiling the health indicator packet, the application 114 may include less that all attributes. For example, the application 114 may include multiple (or all available) health indicator and application attributes in an initial health indicator packet, and then only attributes that have changed in subsequent health indicator packets As an example, when the health indicator for the application 114 is the number of transactions per second, the application 114 may omit the display type (e.g., the "display_type" attribute in Table 1, etc.) and the threshold (e.g., the "threshold_value" attribute in Table 1, etc.) for some or all health indicator packets compiled and submitted after a first health indicator packet. It should be appreciated that the developer(s) involved in the application 114 may define attributes, per health indicator packet, as desired to provide for efficient submission of the health indicator packet.

Further, in various embodiments the application 114 may include/submit multiple health indicators in the same health indicator packet. The JSON standard format, for example, may permit the application 114 to include multiple health indicators in a single health indicator packet, by including the different health indicator packets in braces, { }. For example, the health indicator packet {HiData":[{"appname":"app1","Hi_Name":"transactions per minute" . . . }, {"appname":"app1","Hi_Name":"transactions per minute" . . . },]} includes two health indicators. As should be appreciated, a different number of health indicators may be include in one, two or a different number of health indicator packets in other examples, to provide, for example, efficiencies, etc. in compiling and submitting the health indicator packets, etc.

With continued reference to FIG. 3, for the health indicator packet submitted by the application 114 (and each additional health indicator packet submitted), the collection server 116 receives the health indicator packet, at 310. The collection server 116 then determines, at 312, whether the health indicator packet is consistent with the appropriate standard form required thereby. To do so, the collection server 116, for example, checks the syntax associated with the format to ensure conformance with the applicable standard format (e.g., JSON, CSV, another applicable standard, etc.). When the health indicator packet is inconsistent with the standard format, the collection server 116 issues a failure response, at 314. As an example, when the standard format includes the JSON standard format, the failure response may include "Code 400" (as part of the HTTP standard), indicating Failed/Error, and the particular error code for the failure, for example, "E002" indicating "POST data received could not be parsed as JSON." It should be appreciated that other errors with the particular standard format and/or attributes may be determined by the collection server 116. For example, an error may be found when a threshold value is set, but the threshold is not enabled. Those skilled in the art will readily understand, from the present disclosure, the various error conditions, which may cause the collection server 116 to find an error and issue a response indicating the health indicator packet is failed/error.

Conversely, if the health indicator packet is received without error (at 312), the collection server 116 issues a success response, at 314. As an example, the success response may include "Code 200" (again as part of the HTTP standard), indicating OK/success. The collection server 116 then stores, at 316, the data from the health indicator packet (or the entire health indicator packet) in the packet data structure 120, in memory 204, for example.

In addition, in this exemplary embodiment, the collection server 116 also determines, at 318, if a notification is required in connection with the received health indicator packet. To do so, the collection server 116 determines if the latest health indicator packet enables notification (e.g., at the "enable_notify" attribute in Table 1, etc.). If enabled, the collection server 116 further determines the threshold (or plurality of thresholds) for basis upon which the notification should be sent (e.g., at the "threshold_value" attribute in Table 1, etc.) and then whether the threshold is satisfied. If the threshold is satisfied, the collection server 116 transmits, at 320, a notification consistent with the notification type and notification destination as indicated in the health indicator packet. The notification may include, for example, the name of the application 114 for which the notification is being sent, the name of the health indicator that prompted the notification, the value that triggered the notification and its relationship to the relevant threshold, as well as an indication of whether the threshold was defined as part of the health indicator or calculated by the collection server 116 based on parameters specified in the health indicator packet. In connection therewith, an exemplary notification may include: "Cardholder registrations the last 15 minutes for Virtual Wallet Application are 8, below the defined threshold of 10."

As an example, and with reference to the attributes in Table 1, the application 114 may include a virtual wallet application. In connection therewith, a health indicator included in a health indicator packet for the virtual wallet application may include (as the "description" attribute)

"cardholder registrations in the last 15 minutes," with a maximum threshold value for the indicator of 20 (as the "threshold_type" and "threshold_value" attributes). In this example, the health indicator packet indicates that notifications are to be sent to a user when an input is over the specified maximum threshold (i.e., the "enable_notify" attribute is "Y", the "notify_condition" attribute is "over", the "notify_type" attribute is "email", and the "notify_dest" attribute is john@smith.com). As such, upon receiving the health indicator packet (at 310) and confirming that it conforms to a desired standard format (at 312), the collection server 116 compares the measured value for the indicator of 28 in this example (the "hi_value" attribute) to the threshold value of 20 and determines that the measured value is over the threshold value. In turn, the collection server 116 determines that the threshold is satisfied and that a notification is required (at 318), and generates and transmits an email notification regarding the health indicator packet (e.g., indicating that the measured value for the health indicator is over the provided threshold value) to john@smith.com (at 320). In this example, the notification may include: "Cardholder registrations in the last 15 minutes for Virtual Wallet Application are 28, above the defined threshold of 20."

The collection server 116 repeats the method 300 for additional health indicator packets received from the application 114, and from one or more of the other applications 114. And, as the subsequent health indicator packets are received, the packet data structure 120 is continually populated, by the collection server 116, with health indicators for the applications 114.

Then in this exemplary embodiment, the interface server 118 compiles the health indicator, as defined, in part, in the health indicator packet (as retrieved from the packet data structure 120, for example), into one or more interfaces, and causes the interfaces to be displayed to one or more users (e.g., to the same user the notification is transmitted, to one or more other users, etc.). This may be done in conjunction with storing the health indicator packet (and the associated data) in the packet data structure (at 316 in the method 300), in conjunction with transmitting the notification (at 320 in the method 300), or before or after such time. In any case, the interface server 118 generally compiles the health indicator into the one or more interfaces in real time, as the health indicator packet is received. As can be seen, the interface server 118 generally produces the interfaces in response to client demand (e.g., as requested in the various heath indicator packets, etc.), using the data that has been stored by the collection server 116.

As an example, FIG. 4 illustrates a general application status interface 400, which includes a listing of multiple applications 114, each with a button associated therewith (broadly, a visual effect). The applications 114 are listed according to the application name (e.g., the "app_name" attribute in Table 1, etc.) included in the corresponding health indicator packet (in generally alphabetical order), and the buttons indicate the status of the corresponding applications 114 based on at least one health indicator provided therefore in the health indicator packet (e.g., as defined by a priority attribute (e.g., the "priority" attribute in Table 1, etc.) for the corresponding application 114, etc.). Status of the different applications 114, then, is indicated by particular configurations (e.g., shadings, colors, etc.) in the buttons. For example, in the illustrated interface 400, buttons 402 without color or shading indicate the applications 114 are clear (or have no problems (e.g., no threshold values are violated, etc.)); buttons 402 with hatching indicate the applications 114 have warnings (e.g., threshold values for first health indicators are violated, first threshold values for health indicators are violated, etc.); and buttons 402 with stippling indicate the applications are critical (e.g., threshold values for at least second health indicators are violated, at least second threshold values for health indicators are violated, etc.). Alternatively, the buttons 402 for the different applications 114 may be colored green, yellow, or red, corresponding to clear, warning, and critical, respectively. As such, in this example, the interface 400 is based on multiple health indicators. In connection therewith, the buttons 402 illustrate an overall health indication for the different applications 114 based on how many thresholds for each of the applications are in a trouble state, which is why they have more than one configuration (e.g., clear, hatched, stippled, etc.).

FIG. 5 illustrates a general dashboard interface 500 for different heath indicator values of a widget application (e.g., for different "hi_value" attributes of the widget application, etc.), included in multiple different health indicator packets (or potentially included in a single packet) and stored in the packet data structure 120 (by the collection server 116). In particular, the interface 500 includes six different sections 502-512, each being based on different health indicator values (or combination of values).

As shown, section 502 of the interface 500 includes a bar graph (broadly, a visual effect) based on the relative health indicator packets (in the packet data structure 120) for the widget application indicating a bar graph is the type of display (e.g., indicating "bar" in the "display_type" attribute). The illustrated bar graph, in section 502, includes twenty different health indicator values (as bars) and a threshold value (as a horizontal line), all displayed based on the relevant attributes included in the various health indicator packets, i.e., based on the "display_size," "threshold_enable," "threshold_value," and "threshold_display" attributes. Section 504 includes a line graph (broadly, a visual effect) based on the relative health indicator packets (in the packet data structure 120) for the widget application indicating a line graph is the type of display (e.g., indicating "line" in the "display_type" attribute). The illustrated line graph, in section 504, is based on seventy health indicator values but includes only fifty such health indicator values (as data points), and includes a threshold value (as a horizontal line), all displayed again based on the relevant attributes included in the various health indicator packets, i.e., based on the "display_size" (limiting the display to fifty data points), "threshold_enable," "threshold_value," and "threshold_display" attributes. And section 506 includes a table (broadly, a visual effect) based on the relative health indicator packets (in the packet data structure 120) for the widget application indicating a table as the type of display (e.g., indicating "table" in the "display_type" attribute of the packet). The illustrated table, in section 506, includes fifty different health indicator values, with ones that exceed a threshold value highlighted, all displayed again based on the relevant attributes included in the various health indicator packets, i.e., based on the "display_size," "threshold_enable," "threshold_value," and "threshold_display" attributes.

Sections 508-512 of the interface 500 include similar visualizations/visual effects (e.g., enlargements, etc.) of the health indicators as sections 502-506, as defined by the health indicator packets received and stored in the packet data structure 120, for the widget application. For example, section 508 includes a second bar graph (broadly, a visual effect) based on the relative health indicator packets (in the packet data structure 120) for the widget application indicating a bar graph as the type of display (e.g., indicating "bar" in the "display_type" attribute of the packet). Section 510 includes a second line graph (broadly, a visual effect) based on the relative health indicator packets (in the packet data structure 120) for the widget application indicating a line graph as the type of display (e.g., indicating "line" in the "display_type" attribute of the packet). And, section 512 includes a second table (broadly, a visual effect) based on the relative health indicator packets (in the packet data structure 120) for the widget application indicating a table as the type of display (e.g., indicating "table" in the "display_type" attribute of the packet).

Further, each of the sections 502-512 of the interface 500 may be enlarged as desired. For example, FIG. 6, illustrates the section 502 enlarged, as an interface and by itself. In this manner, a user reviewing the health of the widget application, in the dashboard interface 500, is able to view the health indicator values and trends more clearly, for example, in an enlarged interface.

While the various sections 502-512 in the interface 500 include particular numbers of health indicator values, it should be appreciated that visual effects, as included in interfaces herein, may include any desired number of health indicator values for applications (e.g., N values for a health indicator for an application, where N is an integer; etc.)

In view of the above, the systems and methods herein permit the monitoring of applications associated with a variety of entities, including payment networks. By exposing one or more APIs, and providing a standard form, the systems and method allow application developers to incorporate health indicator reporting with relative ease, in that the developer defines the particular indicators (i.e., not indicators which are predefined). As such, potentially quicker, more efficient, and more detailed reporting and evaluation of applications is permitted. Moreover, the health performance indicators are pushed to the collection server, thereby alleviating the need for the performance tool to have to gather the metrics from numerous different applications. Consistent with the above, health monitoring may reach numerous applications in an efficient manner, especially, when the applications rely on a relatively limited number of services, and still provide visual effects indicative of the health across the numerous applications.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be appreciated that one or more aspects of the present disclosure transform a general-purpose computing device into a special-purpose computing device when configured to perform the functions, methods, and/or processes described herein.

As will be also appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) exposing an application programming interface (API), the API defining a standard form associated with health indicator packets; (b) receiving, via the API, a health indicator packet for a health indicator from at least one application, the health indicator packet conforming to the standard form and including a value for the health indicator for the at least one application; (c) storing the received health indicator packet in a data structure; (d) causing an interface to be displayed to a user, the interface including a visual effect representative of the value, whereby the user is able to assess health of the application, at least in part, by viewing the interface; (e) receiving, via the API, an updated health indicator packet from the at least one application, the updated health indicator packet conforming to the standard form and including an updated value for the health indicator for the at least one application; and (f) providing a notification to a notification destination when the value fails to satisfy the threshold.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in evaluating health associated with a plurality of applications, the method comprising:
    exposing, by a server remote from the plurality of applications, an application programing interface (API) that requires a standard form to the plurality of applications such that the API is callable by the plurality of applications, wherein the plurality of applications are configured to compile a health indicator packet in a standard form and to call the API to submit the health indicator packet to the server, the standard form including a standard format and one or more standard attributes of the health indicator packet: and
    for each of the plurality of applications:
        receiving, at the server, via the API, a health indicator packet for a health indicator from the application, wherein the packet includes a plurality of attributes including a value attribute for the health indicator for the application and a display type attribute for the health indicator for the application, the value attribute defining a value of the health indicator and the display type attribute defining an instruction for display of the value of the health indicator defined by the value attribute;
        determining, by the server, whether the health indicator packet conforms to the standard form;
        when the health indicator packet does not conform to the standard form, transmitting an error message to the application that submitted the packet; and
        when the health indicator packet is in standard form, causing an interface to be displayed to a user, the interface including a visual effect as defined by the display type attribute and representative of the value of the health indicator defined by the value attribute, whereby the user is able to assess health of the application, at least in part based on the value attribute, by viewing the interface.

2. The computer-implemented method of claim 1, wherein the received health indicator packet further includes a first threshold associated with the health indicator; and
    wherein the visual effect is included in a first state when the value of the health indicator, as defined by the value attribute, satisfies the first threshold and in a second state when the value fails to satisfy the first threshold.

3. The computer-implemented method of claim 2, wherein the received health indicator packet further includes a second threshold; and
    wherein the visual effect is included in the first state when the value of the health indicator, as defined by the value attribute, satisfies the first threshold, in the second state when the value fails to satisfy the first threshold but satisfies the second threshold, and in a third state when the value fails to satisfy the first threshold and the second threshold.

4. The computer-implement method of claim 1, further comprising, for at least one of the plurality of applications, receiving, at the server, via the API, an updated health indicator packet from the at least one of the plurality of applications, the updated health indicator packet conforming to the standard form and including an updated value of the value attribute for the health indicator for the at least one of the plurality of applications; and
    wherein, after receipt of the updated health indicator packet, the visual effect is representative of at least the updated value for the health indicator.

5. The computer-implemented method of claim 4, wherein each health indicator packet includes a time stamp; and
    wherein the visual effect is representative of N latest values for the health indicator for the at least one of the plurality of applications, where N is an integer.

6. The computer-implemented method of claim 1, wherein the received health indicator packet includes a threshold attribute and a notification destination attribute associated with the application; and
    further comprising providing, by the server, a notification to a destination indicated by the notification destination attribute when the value of the health indicator defined by the value attribute fails to satisfy a threshold value defined by the threshold attribute.

7. The computer-implemented method of claim 1, wherein the received health indicator packet includes an instruction to determine a threshold for the health indicator based on one or more prior values for the health indicator of the application; and
    wherein the visual effect is included in a first state when the value of the health indicator, as defined by the value attribute, satisfies the threshold based on one or more prior values for the health indicator of the application and in a second state when the value fails to satisfy the threshold.

8. The computer-implemented method of claim 1, further comprising storing, by the server, the received health indicator packet in a data structure; and
    wherein causing the interface to be displayed to the user includes accessing the health indicator packet in the data structure and generating the interface based on the accessed health indicator packet.

9. A system for use in evaluating health for one or more applications associated with a payment network, the system comprising:
    multiple applications associated with a payment network, each of the applications configured to compile health indicator packet(s) in a standard form and to call an application programming interface (API) to submit the health indicator packet(s);
    a collection computing device including a memory and at least one processor, the at least one processor of the collection computing device configured to:
        expose the API to the multiple applications;

receive, from one of the applications, a health indicator packet, via the API, wherein the health indicator packet includes at least: a name of the one of the applications, a name of a health indicator for the one of the applications, a value of the health indicator, a threshold for the health indicator, and an instruction for display of the value of the health indicator;

when the health indicator packet does not conform to the standard form, transmit an error message to the one of the applications that submitted the packet; and when the health indicator packet conforms to the standard form, store the health indicator packet in the memory; and an interface computing device including at least one processor, the at least one processor configured to, based on the stored health indicator packet for the one of the applications, cause at least one interface including a visual effect to be displayed in association with at least one of the name of the one of the applications and the name of the health indicator, the visual effect representative of the value of the health indicator for the one of the applications relative to the threshold for the health indicator and consistent with the instruction for display of the value of the health indicator.

10. The system of claim 9, wherein the collection computing device includes the interface computing device.

11. The system of claim 9, wherein the visual effect is representative of multiple values of the health indicator relative to the threshold for the health indicator for the one of the applications.

12. The system of claim 11, wherein the visual effect is a first visual effect, the at least one interface further including at least a second visual effect representative of the multiple values of the health indicator.

13. The system of claim 9, wherein the standard form is defined, at least in part, by the JavaScript Object Notation (JSON) standard format.

14. system of claim 9, wherein the at least one processor of the collection computing device is further configured to:

receive, from a second one of the applications, a second health indicator packet, via the API, wherein the second health indicator packet includes at least: a name of the second one of the applications, a name of a health indicator for the second one of the applications, a value of the health indicator for the second one of the applications, and a threshold for the health indicator for the second one of the applications;

when the second health indicator packet conforms to the standard form, store the second health indicator packet in the memory; and based on the stored second health indicator packet, cause a second visual effect to be included in the at least one interface, in association with at least one of, the name of the second one of the applications and the name of the health indicator for the second one of the applications, the visual effect representative of the value of the health indicator for the second one of the applications relative to the threshold for the health indicator for the second one of the applications.

15. The system of claim 9, wherein the at least one processor of the interface computing device is configured to:

access at least one additional health indicator packet in the memory and associated with the one of the applications; and generate the at least one interface based on data included in the stored health indicator packet, and data included in the accessed at least one additional health indicator packet.

16. A non-transitory computer-readable storage media including executable instructions for evaluating health for multiple applications, which when executed by a processor, cause the processor to:

expose an application programing interface (API) to multiple applications, each of the multiple applications configured to compile a health indicator packet in a standard form and to call the API to submit the health indicator packet to the processor, the API defining the standard form associated with the health indicator packet; and for each of the multiple applications:

receive, via the API, a health indicator packet for at least one health indicator from the application, the health indicator packet including a name of the application, a name of the at least one health indicator, a value of the at least one health indicator, a threshold for the at least one health indicator, and a display type attribute defining an instruction for display of the value of the at least one health indicator;

determine whether the received health indicator packet conforms with the standard form;

when the received health indicator packet conforms to the standard form, store the health indicator packet in a data structure and cause an interface to include a visual effect associated with the health indicator, in association with at least one of, the name of the application and the name of the at least one health indicator for the application, the visual effect representative of the value of the at least one health indicator for the application relative to the threshold for the at least one health indicator and consistent with the display type attribute; and when the value of the at least one health indicator fails to satisfy the threshold for the at least one health indicator, transmit a notification to a notification destination identified from the received health indicator packet.

* * * * *